(12) United States Patent
Jetter et al.

(10) Patent No.: US 6,516,656 B1
(45) Date of Patent: Feb. 11, 2003

(54) SYSTEM FOR VEHICLE EMISSION SAMPLING AND MEASUREMENT

(75) Inventors: Jeffrey Jay Jetter, Cypress, CA (US); Shinji Maeshiro, Torrance, CA (US); Kazumi Yamazaki, Rancho Palos Verdes, CA (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/473,312

(22) Filed: Dec. 28, 1999

(51) Int. Cl.⁷ .............................................. G01M 19/00
(52) U.S. Cl. ...................................................... 73/118.1
(58) Field of Search ............................. 73/23.31, 23.32, 73/31.05, 31.06, 116, 117.2, 117.3, 118.1

(56) References Cited

U.S. PATENT DOCUMENTS

| | | |
|---|---|---|
| 3,834,136 A | 9/1974 | Dussourd et al. |
| 3,934,989 A | 1/1976 | Haugen |
| 3,998,095 A | 12/1976 | Tinkham et al. |
| 4,467,435 A | 8/1984 | Warnke et al. |
| 4,705,543 A | 11/1987 | Kertzman |
| 4,801,805 A | 1/1989 | Butler et al. |
| 4,857,081 A | 8/1989 | Taylor |
| 4,928,015 A | 5/1990 | Butler et al. |
| 4,944,776 A | 7/1990 | Keyser et al. |
| 4,958,075 A | 9/1990 | Mace et al. |
| 5,042,500 A | 8/1991 | Norlien et al. |
| RE33,678 E | 9/1991 | Campbell et al. |
| 5,138,163 A | 8/1992 | Butler et al. |
| 5,143,695 A | 9/1992 | van den Burg |
| 5,245,405 A | 9/1993 | Mitchell et al. |
| 5,473,162 A | 12/1995 | Busch et al. |
| 5,712,433 A | 1/1998 | Kojima |
| 5,731,510 A | 3/1998 | Jones et al. |
| 5,753,013 A | 5/1998 | Dingfelder |
| 5,843,209 A | 12/1998 | Ray et al. |
| 6,042,634 A | 3/2000 | Van Tassel et al. |

OTHER PUBLICATIONS

"Performance Of A New System For Emission Sampling And Measurement (SESAM)", By Heller et al., SAE The Engineering Society For Advancing Mobility Land Sear Air And Space, International Congress And Exposition, Feb. 26–Mar. 2, 1990, No. 900275, pp. 1–11.

"Model Measurement Of Raw Exhaust Volume And Mass Emissions By SESAM", No. 980047, pp. 61–71 (no date).

Primary Examiner—William Oen
(74) Attorney, Agent, or Firm—O'Melveny & Myers, LLP

(57) ABSTRACT

An improved emission sampling and measurement system is provided for continuously sampling and analyzing the chemical content of a vehicle emissions and the ambient air for data evaluation and comparison. The emission sampling and measurement system comprises a vehicle having an emissions source, devices for intaking vehicle emissions and ambient air, and analysis devices for determining the chemical content of the emissions and ambient air. The gas streams may be dried in a series of selectively permeable drying tubes prior to measurement in the analysis devices, in order to effectuate a more precise sample of the constituent elements of the gases. Following analysis, the data collected is processed, stored, and compared, and the results displayed on a screen in the vehicle driver's compartment in a real-time manner. In this fashion, real-time comparative data analysis is presented in a format not presently available.

42 Claims, 10 Drawing Sheets

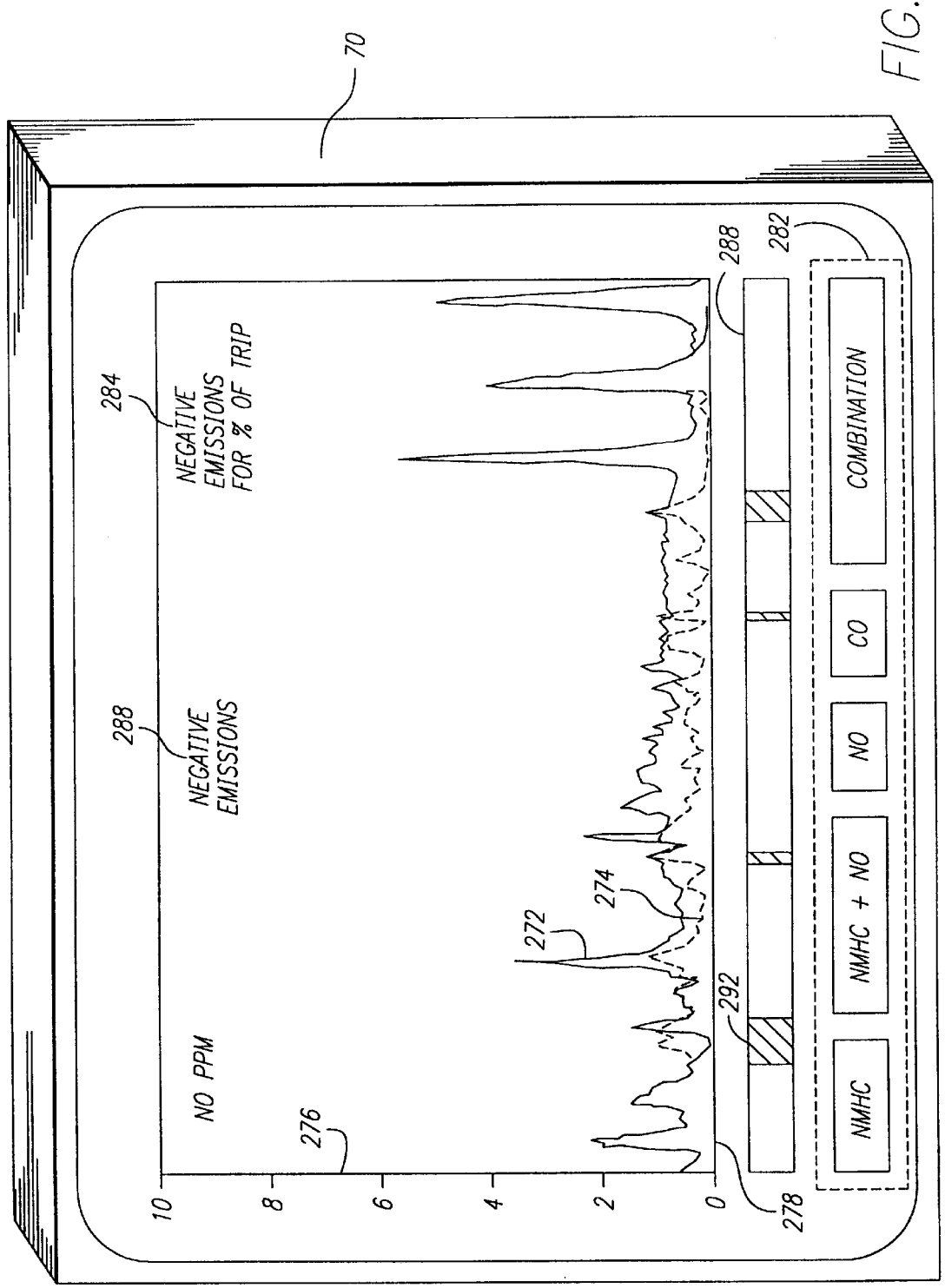

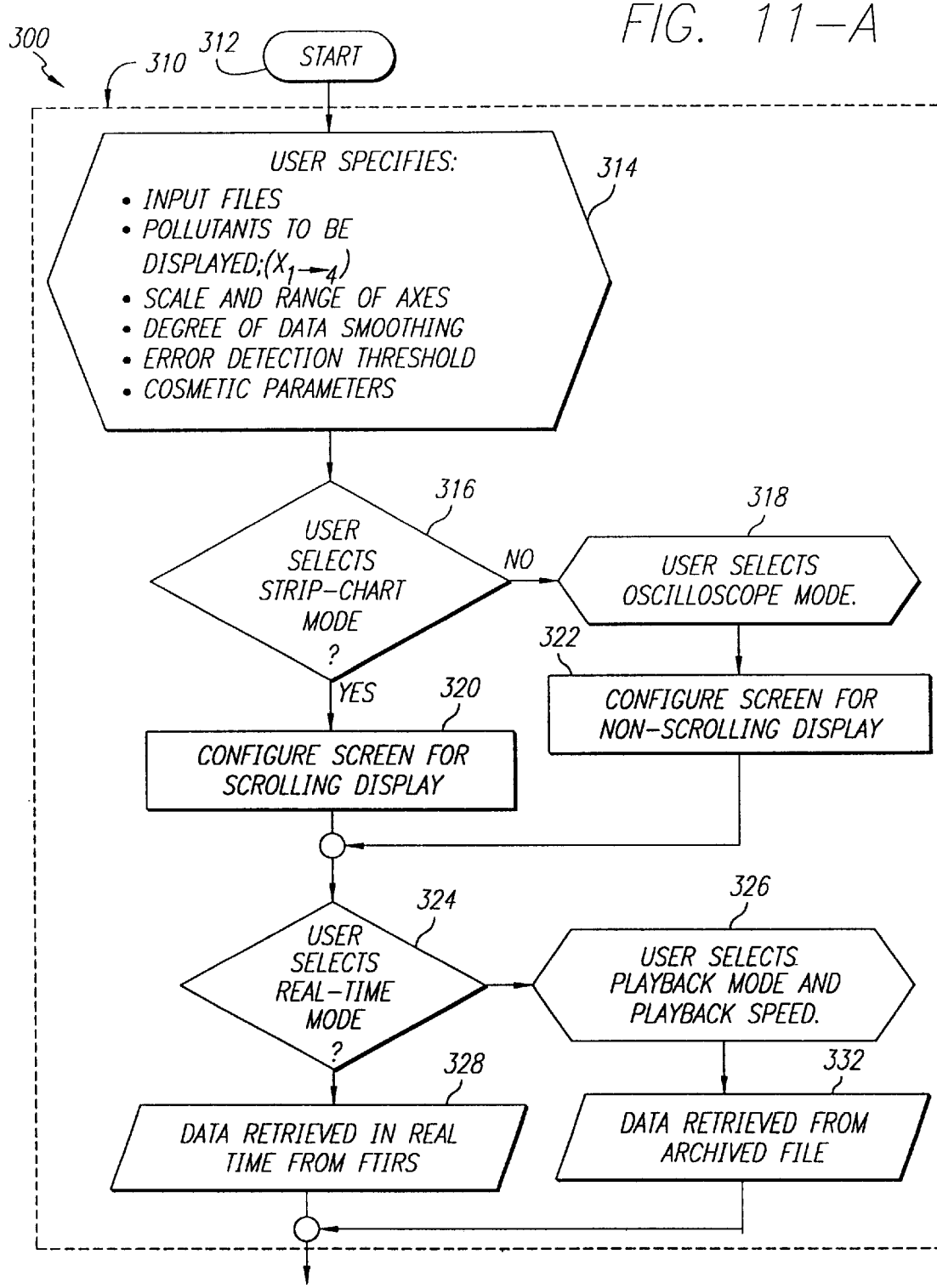
FIG. 11-A

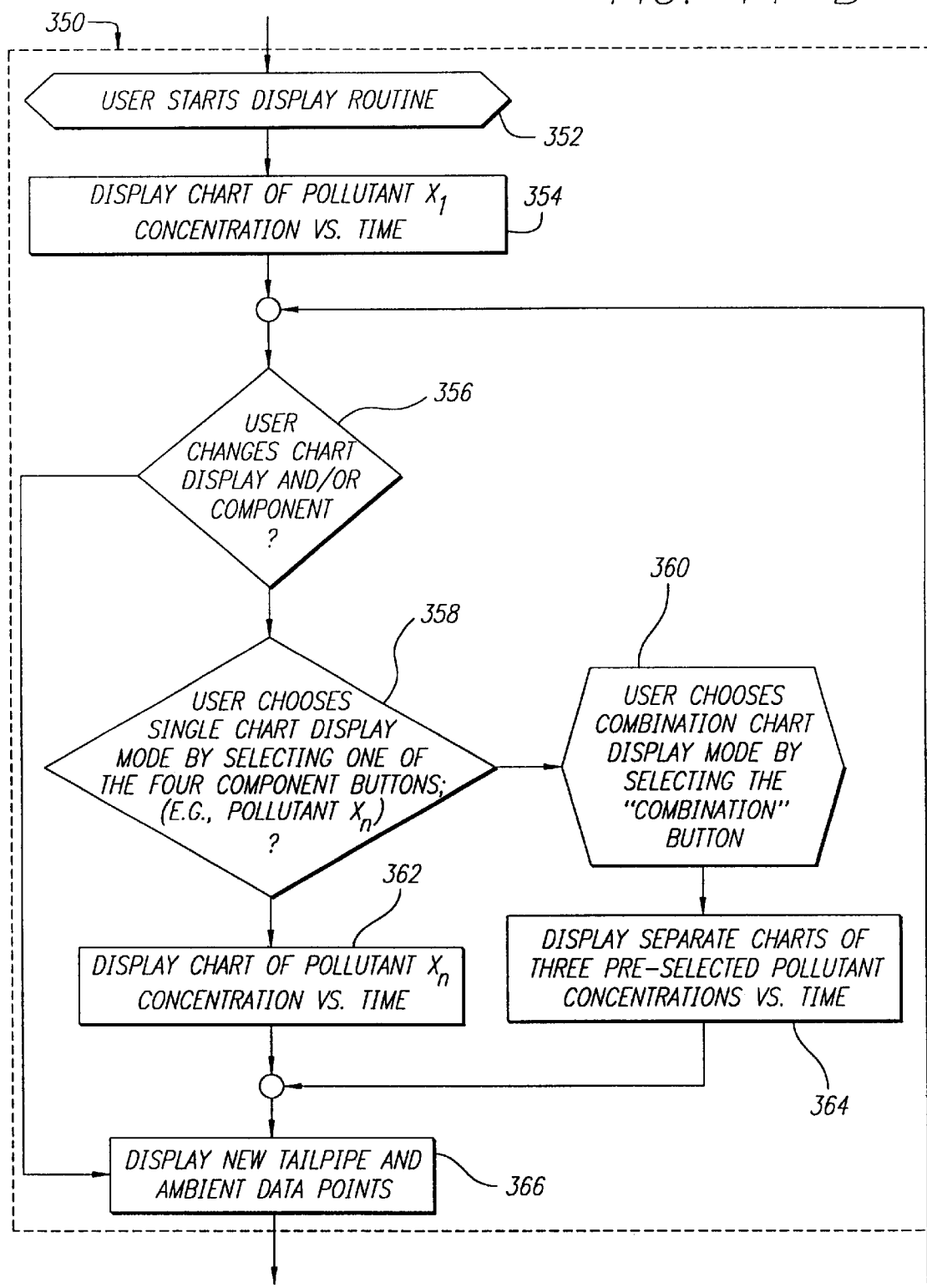
FIG. 11-B

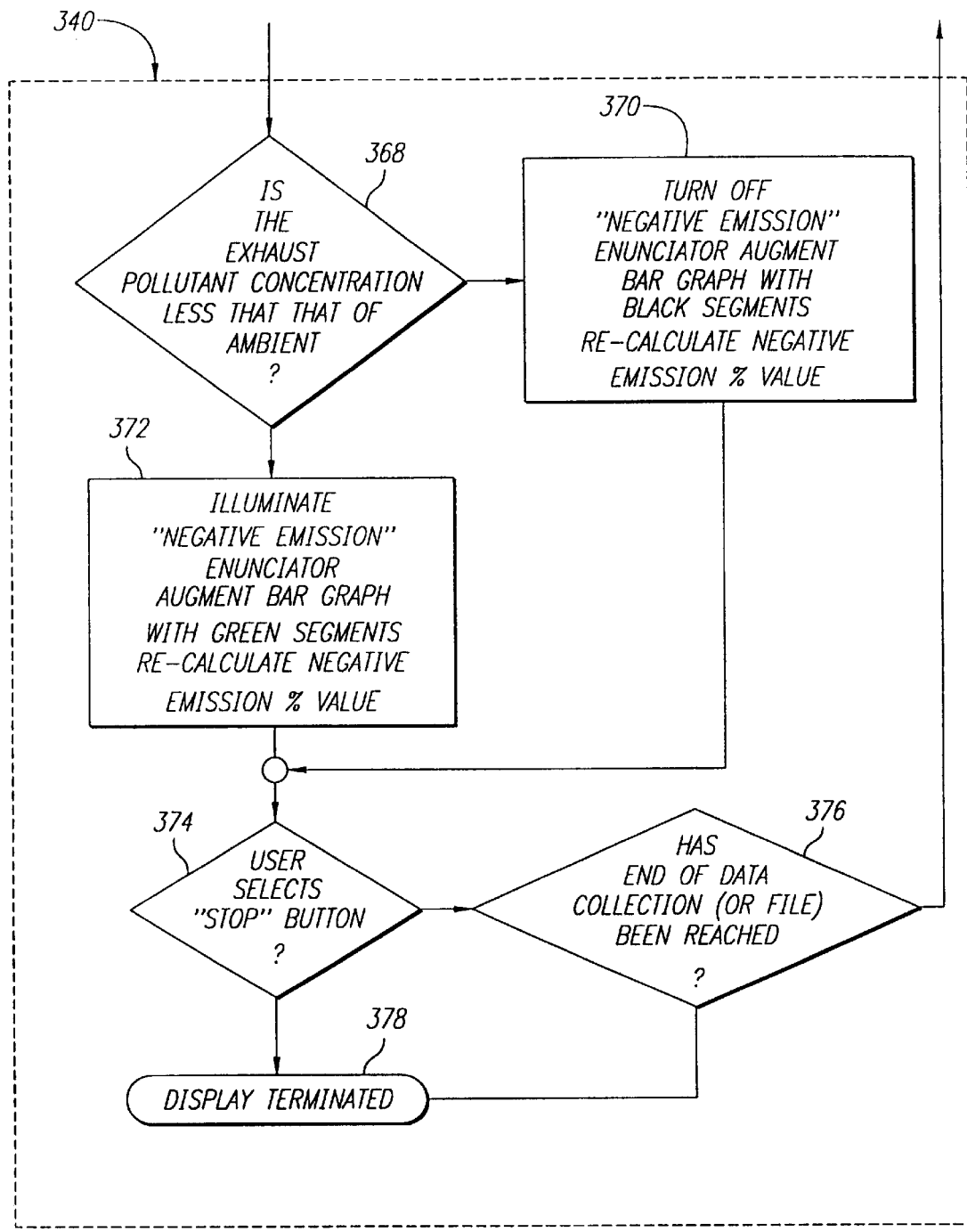
FIG. 11-C

SYSTEM FOR VEHICLE EMISSION SAMPLING AND MEASUREMENT

RELATED APPLICATION DATA

This application relates to co-pending application Ser. No. 09/473,307 for SYSTEM FOR REMOVING WATER FROM A GASEOUS SAMPLE, filed concurrently herewith on Dec. 28, 1999, which is incorporated by reference herein in the entirety.

BACKGROUND OF THE INVENTION

1. Field of the Invention

The present invention relates to an apparatus for making real time evaluations of pollutants in the exhaust gas emissions of motor vehicles, and is particularly, but not exclusively, applicable to the measurement of emissions from near-zero level emissions vehicles. It further relates to the comparison of the levels of contaminants in the exhaust gas emissions of vehicles to the level of pollutants in the ambient air through which the vehicle is travelling.

2. Description of Related Art

Automobile exhaust is a major air pollutant, contributing to increased health concerns and also such unappealing environmental conditions as smog. Los Angeles, well known for its brown haze, is of late only one of a number of major cities to deal with the problem of pollutants. In the fight to combat the deleterious effects of automobile exhaust pollutants, the federal government and many states have required emissions testing of automobiles. A more recent step has been to require automobile manufacturers to produce reduced and low level emissions vehicles. In response to government regulation, and also in the interest of producing reduced level of pollutants, several automobile manufacturers are providing reduced or near-zero emission vehicles to consumers. A necessary corollary of the innovative production of near-zero emission vehicles has been the need to produce pollutant measuring devices that will be able to demonstrate that the vehicles in question have in fact obtained a near-zero level of pollutants. Furthermore, pollution measuring devices may also be useful in vehicle development, such as in calibration of the engine control computer of a vehicle.

Historically, on-line gas analysis of engine exhaust emissions was not used, and vehicles were tested in a laboratory environment. The exhaust from the automobile was piped through a series of systems and collected in bags, and then later analyzed using such gas analysis techniques as chemilluminescence, flame ionization, and total hydrocarbon analysis. However, this process does not sample the ambient air encountered in actual driving conditions for comparison with the vehicle exhaust.

More recent technology advances have made Fourier transformer infrared (FTIR) spectrometric techniques available for use in gas analysis. For example, U.S. Pat. No. 4,928,015 discloses a method of using FTIR quality control techniques for analyzing multi-component constituency in gas emission flow. An FTIR spectrometer can provide simultaneous real-time concentration measurements of exhaust gas components, and is applicable for those gases which absorb infrared radiation in a sample because of the molecular oscillations and rotations. Those gases show a specific infrared absorption at different wavelengths resulting in typical spectra. All of the spectra of gases to be analyzed by the FTIR are stored in the instrument's memory, and then those reference spectra are compared with the spectra of the sample gases during analysis. Subsequently, a method and apparatus for continuously withdrawing and sampling automobile emissions is disclosed in U.S. Pat. No. 5,138,163. That technique is sufficiently accurate for testing a sample of exhaust from traditional internal combustion engines.

One of the chief problems faced in sampling exhaust from near-zero emission vehicles is obtaining a dry sample. Any moisture in the line can significantly alter test data. As such, it is imperative that water be removed so that the moisture will not interfere with the FTIR readings. Some methods for obtaining a satisfactory sample include heating the gas itself to a temperature in excess of 100° C. in order to maintain any water present in a vapor state, diluting the gas flow with the addition of large quantities of a non-reactive gas such as nitrogen, or passing the gas though a bank of desiccants to dehydrate it. All three of these methods have drawbacks. In the case of heating the gas to temperatures in excess of 100° C., any reference or comparative samples also have to be heated to the same temperature to achieve an accurate comparison. Furthermore, even when maintained in a vapor state, the moisture may provide interference with certain low level FTIR measurement analysis. Diluting the gas with large quantities of a non-reactive gas decreases the level of sensitivity of the sample that can be obtained due to the dilution of the sample contents, thus providing a less accurate analysis. Also, dilution requires the presence of large tanks containing the diluting gas, making a compact system difficult to achieve. Alternatively, if ambient air is used in the dilution process, the pollutants in the ambient air may have an adverse effect on pollutant measurements when dealing with near-zero emission vehicles. And finally, passing the sample through a desiccant bank often removes gaseous components that are desirable for testing along with the water vapor.

The most recent technological advances in the art of moisture removal include the use of selectively permeable materials to remove water vapor via osmosis. For instance, U.S. Pat. No. 5,042,500 discloses a drying sample line for coupling a patient's expiratory gases to a gas analyzer. The drying sample line comprises concentric tubes wherein the innermost tube is fabricated from a perflourinated polymer material sold as Nafion®. The perflourinated polymer material exhibits high permeability to water vapor but does not readily pass other gases. The expiratory gas is drawn through the inner tube and, simultaneously, dried air is made to pass through the outer tube in a counterflow direction relative to the expiratory gases. Because of the properties of the perflourinated polymer material, water vapor (i.e., moisture) contained in the expiratory gas being coupled to the analyzer passes through the wall of the tube and into the dried air stream. Consequently, the water vapor is removed from the expiratory gas mixture being applied to the analyzer. There are existing products on the market that employ in-line systems utilizing perflourinated polymer tubing for drying gas streams.

While it is known to remove moisture from gases utilizing selectively permeable materials in fields such as medicine and in exhaust gases, no system exists that is both compact and efficient enough to provide the level of water removal required to allow for accurate testing onboard a moving near-zero emission vehicle. More particularly, a need exists for a cost effective and compact apparatus to remove moisture in sufficient quantities to allow for testing of exhaust gases while a near-zero emission vehicle is operating under standard road conditions, out of the lab and in its normal operating environment.

Another key testing data point relating to near-zero emission vehicles is comparison of the vehicle emission or exhaust with that of the ambient atmosphere. It would be extremely beneficial to be able to measure the actual level of pollutants in the ambient air through which the vehicle is travelling, and compare that to the level of pollutants being emitted by the vehicle. Presently, no device exists for real-time comparison of the level of pollutants in the vehicle exhaust to those found in the ambient atmosphere while the vehicle is travelling. For instance, in those urban environments where the level of ambient pollutants in the atmosphere is high, such high levels may distort the measurements being recorded concerning the vehicle exhaust. Therefore, a system which shows the level of pollutants in the atmosphere and is able to compare that to the level of pollutants being generated by the vehicle, can actually prove that the vehicle is producing a negative level of emissions. Where real-time analysis of both the effluent exhaust gases from a near-zero emission vehicle and the ambient air in which that vehicle is operating is required, it is essential that a compact and efficient system be available that will remove the moisture from both gas streams for proper FTIR analysis and provide the requisite feedback mechanisms to record and display the data.

Although conventional systems may detect pollutant levels, there remains an unmet need for a system that is compact enough to be placed on-board an automobile and that is able to measure the pollutant levels in a vehicle exhaust and compare those levels to the ambient atmosphere. That need is only heightened with the advent of near-zero emission vehicles.

SUMMARY OF THE INVENTION

In addressing the needs and deficiencies of the prior art, a system for sampling and measuring vehicle emissions, and comparing the results of the vehicle emissions to ambient air is provided.

More particularly, the vehicle emission sampling and measurement system of the present invention comprises both an intake for collecting an emission source and an intake for collecting ambient air. Both intake sources are coupled to analyzers that are disposed in the vehicle. The analyzers evaluate the chemical content of the emission source and the ambient air and provide corresponding electrical signals to a data processor. The signals corresponding to the chemical content of the emission source and the ambient air may then be compared and displayed on a screen connected to the processor.

Additionally, the vehicle emission sampling and measurement system may further comprise a water removal system for drying the gas streams prior to analysis in the analyzers. This water removal system may comprise a plurality of drying tubes coupled together in series, the drying tubes having a first flow path for the gas being sampled and a second flow path for a purge gas. Furthermore, the water removal system may comprise a series of heating and cooling stages wherein the efficiency of the drying tubes is increased. The analyzers may comprise Fourier transformer infrared spectrometer devices wherein the constituent chemical components of the gases are analyzed on a continuous real-time basis. In such a system, both the vehicle emissions and the ambient air are continuously gathered, analyzed and compared, and the results are stored and displayed in a real-time format.

A more complete understanding of the emissions sampling and measurement system will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 10 is a screen display of emission data processed by the emission sampling and measurement system; and FIGS. 11A–11C are logic diagrams illustrating operation of the real-time display software.

DETAILED DESCRIPTION OF THE PREFERRED EMBODIMENT

The present invention satisfies the need for a compact and efficient process for analyzing exhaust from a low level emissions motor vehicle and comparing the pollutants found in the exhaust with those found in the atmosphere. In the detailed description that follows, like element numerals are used to describe like elements illustrated in one or more of the figures.

Figure 1:
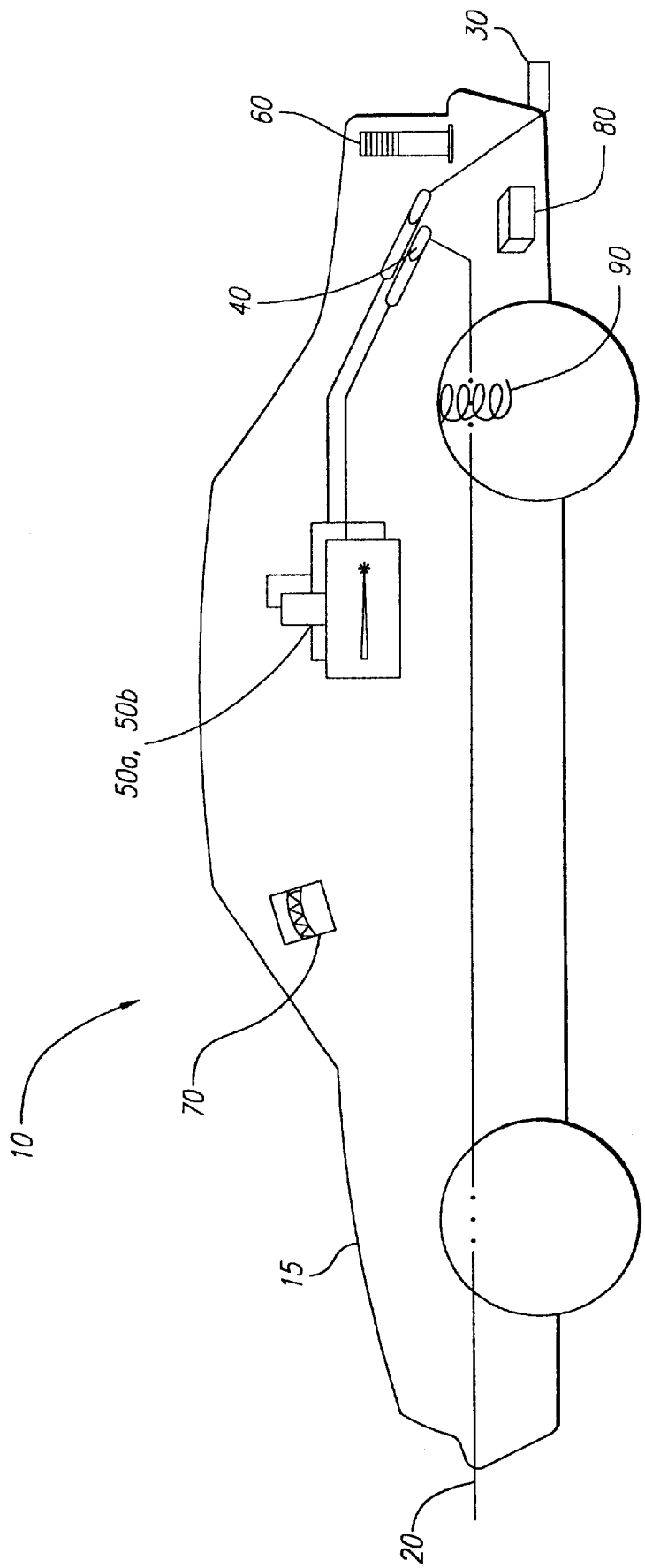
FIG. 1 is a system schematic drawing of a real-time, in-line automobile emission sampling and measurement system.

Referring first to FIG. 1 of the drawings, a system schematic drawing of an emissions measuring system 10 is shown. The emissions measuring system 10 comprises an outside air intake 20, an exhaust intake 30, a water removal system 40, Fourier transformer infrared instruments 50a, 50b, and a computer 60. The emissions measuring system is incorporated within a motor vehicle 15 having an emission source, such as an internal combustion motor (not shown). For purposes of this description, a sedan type model vehicle 15 has been depicted; however, it should be readily apparent to one skilled in the art that the emissions measuring system 10 would be readily applicable to other types of vehicles such as sport utility vehicles or trucks.

The emissions measuring system 10 is adapted to measure the pollutant levels in the exhaust system of the vehicle 15. The outside air intake 20 couples ambient air into the emissions measuring system 10. The outside air intake 20 is located on the forward structural body component of the motor vehicle 15, and is shown with more particularity in FIG. 3 (described below). The exhaust intake 30 couples vehicle exhaust from the emissions source into the emissions measuring system 10 for testing. The exhaust intake 30 is located at the rearward portion of the vehicle, adjacent and extending into the vehicle exhaust pipe. The exhaust intake 30 is shown with more particularity in FIG. 4 (described below).

The water removal system 40 is located in the rearward portion of the vehicle 15 and is used to remove the water vapor (moisture) contained in the ambient air and in the exhaust gas streams. For example, the water removal system 40 may be disposed in the vehicle trunk. Both the outside air intake 20 and the exhaust intake 30 are coupled to the water removal system 40 by piping such that both the exhaust gas and the ambient air are communicated from their respective intake devices to the water removal system 40. Consequently, both gas streams may be dried by the water removal system 40. The water removal system 40 comprises a series of selectively permeable ion exchange polymer tubes located in both heating and cooling stages wherein the moisture is removed from the gas via osmosis. The water removal system 40 is shown with greater particularity in FIGS. 5–8 (described below).

The two Fourier transformer infrared (FTIR) instruments 50*a* and 50*b* analyze the multi-component constituency of gaseous streams. More particularly, the FTIR instruments 50*a* and 50*b* comprise spectrometer devices that provide real-time concentration measurements of gaseous components for those gases which absorb infrared radiation. The FTIR instruments 50*a*, 50*b* generate respective electrical signals that correspond to the concentration measurements. An exemplary FTIR instrument is shown with greater particularity in FIG. 9 (described below). The FTIR instruments 50*a* and 50*b* are located in the rearward portion of the vehicle 15, but forward of the water removal system 40. For example, the FTIR instruments 50*a*, 50*b* may be disposed in the trunk or the back seat area of the motor vehicle 15. The water removal system 40 is connected to the FTIR instruments 50*a* and 50*b* by piping wherein the exhaust and ambient air gas streams are communicated from the water removal system 40 after the gases have been dried to respective ones of the FTIR instruments 50*a*, 50*b*. A differential pressure in the system creates the motive force for the gases to travel from their respective intake devices 20, 30, through the water removal system 40 and then to the FTIR instruments 50*a*, 50*b*.

The onboard computer 60 is located in the rearward portion of the vehicle 15, such as in the vehicle trunk. The onboard computer 60 is a computer system adapted to perform the logic computational steps to convert the electrical signals sent by the FITR instruments 50*a*, 50*b* into data streams that may be displayed visually. Additionally, the onboard computer 60 includes a memory to electronically store gas measurement analysis information. The FTIR instruments 50*a*, 50*b* are electrically connected to the on-board computer 60 by a data transfer device (not shown) wherein the gas measurement analysis information may be transferred to the computer for subsequent processing. The electrical connection between the FTIR instruments 50*a*, 50*b* and the computer 60 may comprise a wire adapted to conduct electronic signals, a coaxial cable adapted to conduct electronic signals, or a wireless broadcast and reception system adapted to the sending and receiving of the gas analysis data.

The emissions measuring system 10 may further include a display/control panel 70 comprising a video display screen such as a cathode ray tube (CRT) or liquid crystal display (LCD). The display/control panel 70 may further be a touch screen that allows touch-type commands to call up the various data measured by the FTIR instruments 50*a*, 50*b*. Alternatively, a separate keyboard may be provided to allow entry of commands. The display/control panel 70 may be located in the front-passenger compartment within reach of the driver of the vehicle 15. The on-board computer 60 is electrically connected to the display/control panel 70, as known in the art.

Also located in the rear portion of the vehicle 15 is a power source 80 that provides the energy requirements to run the various power-using components of the emissions measuring system 10. The power source 80 used in an embodiment of the invention includes a bank of NiMH rechargeable batteries with an electrical voltage output sufficient to provide power for the electronic components of the exhaust measuring system 10; however, alternative power supply sources could also be used. The power source 80 contains a converter adapted to convert the direct current to three-phase alternating current. The power source 80 is connected to the water removal system 40, the FTIR instruments 50*a* and 50*b*, the on-board computer 60, and the display/control panel 70, to provide electrical power thereto.

Lastly, an enhanced adjustable suspension 90 may be incorporated into the vehicle 15. The enhanced adjustable suspension 90 is a heavier duty suspension than is normally placed in a factory model vehicle, and may be included for the purpose of creating a smoother and more level ride to accommodate the increased weight in the rear of the vehicle 15 due to components of the emissions measuring system 10. The enhanced adjustable suspension 90 is located on the rear-wheel structural members of the vehicle 15.

When the vehicle is moving, the outside air intake 20 allows a stream of ambient air to enter the exhaust measuring system 10. At the same time, engine exhaust gases enter the exhaust measuring system 10 through the exhaust intake 30. Both gas streams, i.e., the outside air and the exhaust gas, are drawn first through the water removal system 40. In the water removal system 40, the water vapor (i.e., moisture) is removed from the two gas streams in order to provide dry gas samples for analysis. From the water removal system 40, the dry gas streams pass to respective ones of the FTIR instruments 50*a*, 50*b*, in which the gases are analyzed to determine the content of their constituent components, particularly any pollutants. The gases are then exhausted overboard. The FTIR instruments 50*a*, 50*b* generate electrical signals which are sent to the networked computer 60 which compiles and stores the signals and produces a corresponding video data signal. The video data signal is then sent to the display/control panel 70 for display as a visual image. Using a touch screen on the display/control panel 70, the operator of the vehicle 15 can choose between a plurality of choices of data for display on the display/control panel 70.

Figure 2:
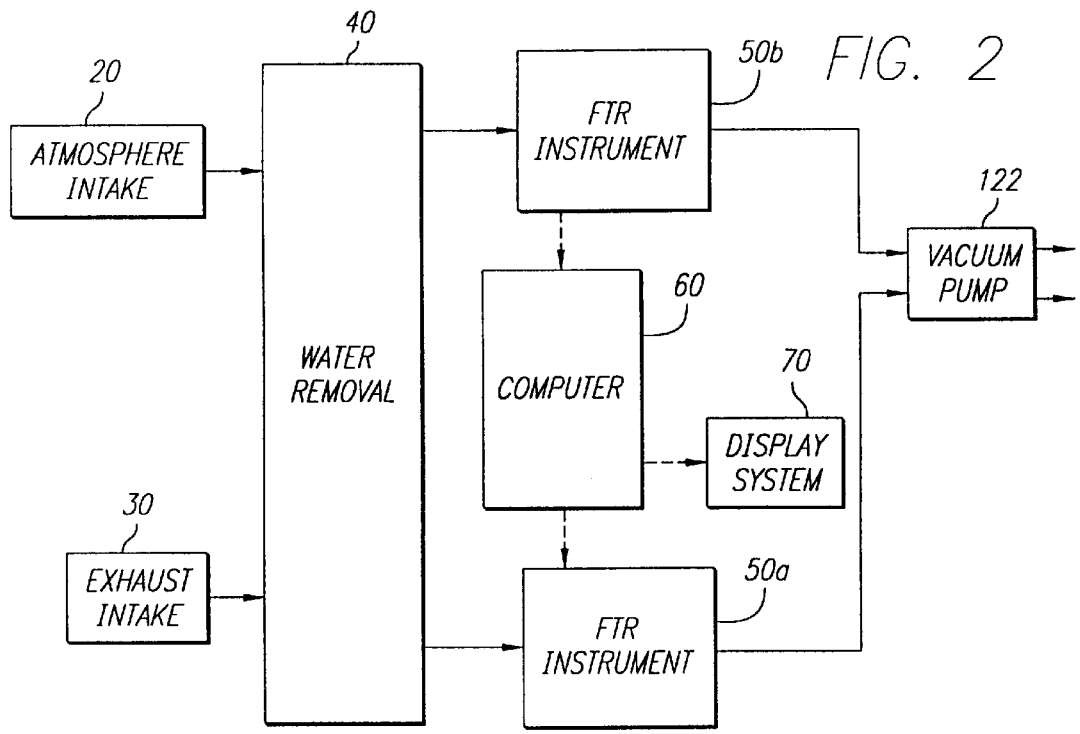
FIG. 2 is a block diagram of the emission sampling and measurement system.

Referring next to FIG. 2, a block diagram indicating the flow-path of the gases and the analysis path of the data for the emissions measuring system 10 is shown. The gas stream is shown by solid lines, while the data stream is shown by a dotted line. The exhaust intake 30 becomes preheated, and along with the atmospheric intake 20 is drawn through the water removal system 40. Both gas streams are then drawn through respective ones of the FTIR instruments 50*a*, 50*b* by a double-head vacuum pump 122, and then exhausted overboard. The FTIR instruments 50*a*, 50*b* analyze the gas and then download data to the computer 60. The computer 60 sends the data to be displayed to the display/control panel 70. The display/control panel 70 and the computer 60 are adapted to interact such that various commands may be sent from the display/control panel 70 to the computer 60.

Figure 3:
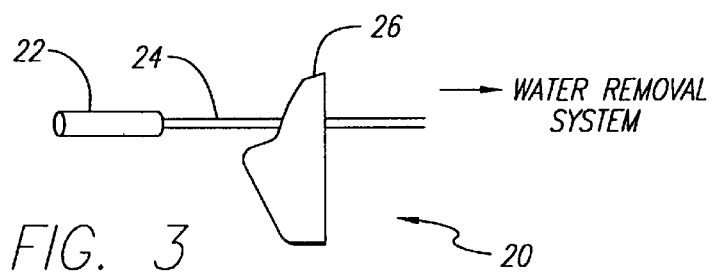
FIG. 3 is a side view of the atmospheric intake components.

Referring next to FIG. 3, the outside air intake 20 is shown in greater detail. The outside air intake 20 comprises two elements, including a quick connect fitting 22 and an outside inlet pipe 24. The quick connect fitting 22 comprises a hollow, cylindrical, quick-release disconnect-type fitting that allows test equipment to be connected to the emissions measuring system 10 for testing purposes, and also allows outside ambient air to enter the system. The outside inlet piping 24 comprises a tubular pipe that allows the outside air to be transported to the water removal system 40. A front section 26 of the vehicle 15 is shown for reference. The quick connect fitting 22 is connected to the outside inlet pipe 24, and extends outwardly from the front section of the vehicle 26 to a distance of approximately three inches. The outside inlet pipe 24 is connected to the water removal system 40.

Figure 4:
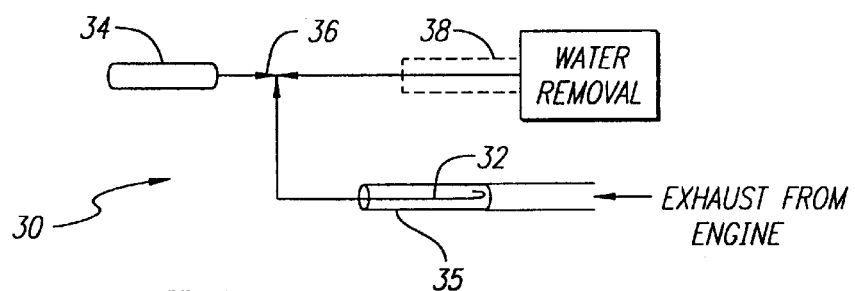
FIG. 4 shows a drawing of the exhaust intake components.

Referring next to FIG. 4, the exhaust intake 30 is shown in greater detail. The exhaust intake 30 allows exhaust gases to be drawn into the emissions measuring system 10 and comprises an exhaust inlet pipe 32, a quick connect fitting 34, and a three-way valve 36. The exhaust inlet pipe 32 has a tubular shape and extends into the vehicle tailpipe 35 and permits exhaust gases to be drawn into the emissions measuring system 10. The exhaust inlet pipe 32 extends into the tailpipe 35 by approximately twenty inches. The quick connect fitting 34 comprises a hollow, cylindrical, quick-release disconnect-type fitting that allows test equipment to be connected to the emissions measuring system 10 for testing and/or calibration purposes. The three-way valve 36 comprises a valve adapted to permit flow from either of two sources to a common piping system. Both the exhaust inlet pipe 32 and the quick connect fitting 34 are connected to the three-way valve 36, which is in turn connected to the water removal system.

Figure 5:
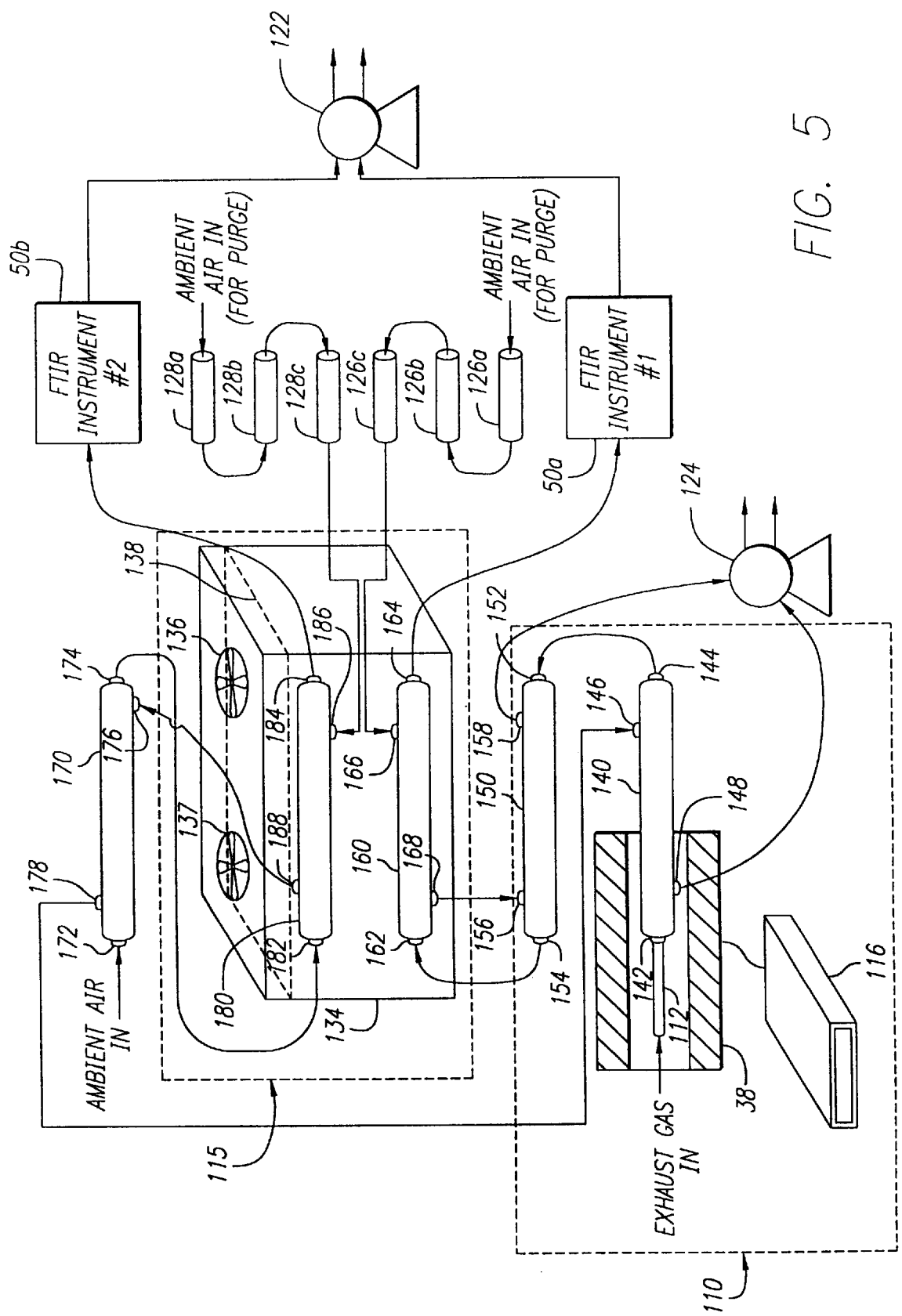
FIG. 5 is a schematic diagram illustrating the water removal system and its constituent components.

FIG. 5 is a block diagram of the water removal system 40 and the FTIR instruments 50a, 50b. The water removal system 40 removes moisture from both the atmospheric air and the exhaust gases so that both gas streams may be analyzed with greater accuracy. The exhaust gas stream is also referred to herein as a primary gas stream, and the atmospheric air gas stream is also referred to herein as a secondary gas stream. As will be further described below, the water removal system 40 includes a primary drying system for the primary gas stream, and a secondary drying system for the secondary gas stream. The primary drying system includes a heating stage 110 that maintains the exhaust gas above the dew point temperature until most of the water has been removed. The secondary drying system does not include such a heating stage, and is intended to remove vapor from samples wherein the water content is already above the dew point temperature for a given ambient condition, such as during most weather conditions.

More particularly, the water removal system 40 comprises a heating stage 110 and a cooling stage 115. Drying of the primary gas stream occurs in both the heating stage 110 and the cooling stage 115; additionally though, the gas is alternatively heated and cooled in order to increase the efficiency of the water removal system 40. The heating stage 110 is the foremost stage of the water removal system 40 and heats the gas to approximately 70° C. There are two reasons for heating the primary gas stream. First, the interaction of liquid water with the perflourinated polymer tubing is endothermic, and leads to a cascade failure reaction. Therefore, the gas must be kept above the dew point temperature until most of the water has been removed. Second, the initial water absorption and transport by the perflourinated polymer tubing proceeds as a First Order Kinetic reaction, in which absorption becomes more rapid with increasing temperature. The cooling stage 115 is the latter stage of the water removal system 40 and lowers the temperature of the gas to increase the efficiency of the drying elements in the cooling stage 115. The purpose of the cooling stage is to draw more of the retained water from the sulfonic acid group, since the residual retained water becomes the limiting factor after the First Order Kinetic reaction.

The heating stage 110 further includes an inlet tube 112, a heating sleeve 38, a heater controller 116, a first stage drying tube 140, and a second stage drying tube 150. The inlet tube 112 comprises an elongated cylindrical tube that is open on both ends. The heating sleeve 38 may comprise a resistance type heater shaped in a tubular fashion such that it may be wrapped around components that are to be heated. The heating sleeve 38 is electrically connected to a heater controller 116 that regulates the temperature of the heating sleeve. Each of the first and second stage drying tubes 140, 150 comprises a bundle of selectively permeable perflourinated polymer tubes surrounded by a rigid shell, as will be further described below with respect to FIG. 6. The first and second stage drying tubes 140, 150 each include an exhaust gas flow inlet 142, 152 and outlet 144, 154, and a purge gas flow inlet 146, 156 and outlet 148, 158.

The inlet tube 112 and a portion of the first stage drying tube 140 are enclosed by the heating sleeve 38. The inlet tube 112 is connected to the exhaust gas flow inlet 142 of the first stage drying tube 140. As shown in FIG. 5, the heating sleeve 38 includes a cylindrical portion that surrounds the inlet tube 112 and further extends to surround the foremost half of the first stage drying tube 140. The exhaust gas flow outlet 144 of the first stage drying tube 140 is connected to the exhaust gas flow inlet 152 of the second stage drying tube 150. The purge gas flow outlet 148 of the first stage drying tube 140 is connected to a double head purge vacuum pump 124. The double head purge vacuum pump 124 may comprise a centrifugal type pump capable of maintaining at least five inches Hg vacuum.

The cooling stage comprises a third stage drying tube 160 and an ice bath 134. The ice bath 134 comprises a thermodynamically insulating material formed in a shell containing a volume of ice and water within the thermodynamic boundaries of the shell. The ice bath shell may be configured in the shape of a box and is enclosed on all six sides, but contains openings permitting the various components of the drying system 40 to pass therethrough. Further, the ice bath shell should have one or more openings to permit the replenishment of ice and the draining of water. The ice bath shell may be comprised of a rigid material to maintain its shape while holding a volumetric capacity of the ice and water mixture. The third stage drying tube 160 is similar in construction to the first and second stage drying tubes 140, 150 described above, and includes an exhaust gas flow inlet 162 and outlet 164, and a purge gas flow inlet 166 and outlet 168. The third stage drying tube 160 is disposed within the ice bath 134 below the surface 138 of the water and ice.

The exhaust gas flow outlet 154 of the second stage drying tube 150 is connected to the exhaust gas flow inlet 162 of the third stage drying tube 160. The exhaust gas flow outlet 164 of the third stage drying tube 160 is connected to FTIR instrument 50a. Accordingly, the first, second and third stage drying tubes 140, 150, 160 are each connected in series. Exhaust gas drawn into the sample gas flow inlet 142 of the first stage drying tube 140 will pass successively through the second and third stage drying tubes 150, 160 and be ultimately provided to the FTIR instrument 50a.

The purge gas flow outlet 168 of the third stage drying tube 160 is connected to the purge gas flow inlet 156 of the second stage drying tube 150. The purge gas flow outlet 158 of the second stage drying tube 150 is connected to the double head purge vacuum pump 124. A dry purge air source is provided by three desiccant tubes 126a, 126b, and 126c each containing a suitable material, such as $CaSO_4$. Each one of the desiccant tubes 126a–126c has an inlet and outlet, and the three tubes are connected in series. The outlet of the third tube 126c is connected to the purge gas inlet 166 of the third stage drying tube 160. Accordingly, a constant flow of purge air passes through the desiccant tubes 126a–126c, and through the second and third drying tubes 150, 160. The FTIR instrument 50a is connected to a double head vacuum pump 122 that draws the exhaust gas through serially connected first, second and third stage drying tubes 140, 150, 160. The double head vacuum pump 122 may comprise a centrifugal type pump capable of maintaining at least four inches Hg vacuum.

As also shown in FIG. 5, the atmospheric gas brought into the emissions measuring system 10 is also dried in the moisture removal system. The components utilized to dry the atmospheric gas are similar to the components already described above. The atmospheric drying portion includes a first stage atmospheric drying tube 170 and a second stage atmospheric stage drying tube 180. Additionally, three additional desiccant tubes 128a, 128b, and 128c are shown.

The atmospheric gas inlet 172 of the first stage secondary drying tube 170 receives an atmospheric gas stream from the outside air intake 20 (see FIG. 1). The atmospheric gas outlet 174 of the first stage atmospheric drying tube 170 is connected to the atmospheric gas inlet 182 of the second stage atmospheric drying tube 180. The second stage atmospheric drying tube 180 is disposed in the ice bath 134 along with the third stage exhaust drying tube 160. The atmospheric gas outlet 184 of the second stage atmospheric drying tube 180 is coupled to the second FTIR instrument 50b. The purge gas inlet 186 of second stage atmospheric drying tube 180 is coupled to the three serially coupled desiccant tubes 128a, 128b, and 128c. The purge gas outlet 188 of the second stage atmospheric drying tube 180 is connected to the purge gas inlet 176 of the first stage atmospheric drying tube 170. The purge gas outlet 178 of the first stage atmospheric drying tube 170 is connected to the purge gas inlet 146 of the first stage exhaust drying tube 140, which is in turn connected to the double head purge vacuum pump 124 through the purge gas outlet 148 of the first stage exhaust drying tube 140. Both of the FTIR instruments 50a and 50b are coupled to the double head vacuum pump 122.

In operation, the exhaust gas enters the water removal system 40 through the inlet tubing 112. The exhaust gas is drawn and maintained at a slight vacuum by the double head vacuum pump 122, which provides the pressure differential essential for gaseous flow. The exhaust gas becomes heated by the heating sleeve 38 as it is flowing through the inlet tube 112. In an embodiment of the invention, the heating sleeve 38 is maintained at approximately 70° C. by operation of the heater controller 116. The exhaust gas travels from the inlet tube 112 to the first stage drying tube 140. The heating sleeve 38 also encloses the first half of the first stage drying tube 140 (as described above), and heats the exhaust gas as it travels through the first stage drying tube 140. Moisture is removed from the exhaust gas by the first stage drying tube 140 as the exhaust gas travels therethrough in a process that will be described below. The removed moisture exits the first stage drying tube 140 through the purge gas outlet 148.

After the gas exits the exhaust gas outlet 144 of the first stage drying tube 140, it is drawn into the exhaust gas inlet 152 of the second stage drying tube 150. More moisture is removed from the gas by the second stage drying tube 150 as the gas travels through the second stage drying tube 150.

After exiting the exhaust gas outlet 154 of the second stage drying tube 150, the exhaust gas is drawn into the exhaust gas inlet 162 of the third stage drying tube 160. The third stage drying tube 160 is contained within the ice bath 134, which is maintained at approximately 0° C. The temperature of the exhaust gas is lowered as it travels through the third stage drying tube 160 disposed in the ice bath 134. This cooling of the exhaust gas brings the moisture vapor contained in the gas closer to its dew point, which increases the efficiency of the drying tubes as will be further described below. After exiting the exhaust gas outlet 164 of the third stage drying tube 160, the now fully dried sample gas is drawn into the FTIR instrument 50a, where the exhaust gas is analyzed to determine its component makeup. Finally, the gas passes through the double head vacuum pump 122, and is exhausted from the system. It should be appreciated that a different number of drying tubes could be advantageously utilized, and the three drying tubes 140, 150, 160 are merely exemplary of a sample gas drying system.

The atmospheric gas enters the system and is drawn by the double-head vacuum pump 122 into the wet sample inlet 172 of the first stage drying tube 170, and exits via the dry sample outlet 174. The atmospheric gas is then drawn into the wet sample inlet 182 of the second stage drying tube 180 which is located in the same ice bath 134 as the third stage drying tube 160 utilized for drying the exhaust gas. The atmospheric sample gas is then drawn to the FTIR instrument 50b. As described, the double-head vacuum pump 122 provides the motive for both the exhaust and atmospheric gas streams.

The ambient purge air follows one of two paths, either as purge air for the atmospheric sample gas or for the exhaust sample gas. Both streams are drawn by the double-head purge vacuum pump 124. The purge air provides a lower moisture gaseous flow and a consequent water vapor pressure gradient so that moisture will travel via the ionic channels of the perflourinated polymer drying tubes 140, 150, 160, 170, 180 from the area of higher concentration moisture, i.e., the exhaust gas, into the area of lower moisture concentration, i.e., the purge air. Ambient purge air for the exhaust sample gas is drawn into and through the system by the double head purge vacuum pump 124, and passes through the desiccant tubes 126a, 126b, and 126c. After the purge air exits the third of the desiccant tubes 126c, the purge air enters the dry purge inlet 166 of the third stage drying tube 160, and exits via the wet purge outlet 168. The ambient purge air is then drawn in series through the second stage drying tube 150 and is exhausted to the ambient surroundings via the double head purge vacuum pump 124. The purge air is maintained at a vacuum, which effectively lowers the dew point of the purge air even further, enhancing the water vapor pressure gradient and increasing the drying properties of the desiccated ambient air. It should be appreciated that a different number of desiccant tubes could be advantageously utilized, and the three desiccant tubes 126a, 126b, 126c are merely exemplary of a purge air drying system.

The ambient purge air for the atmospheric gas stream is drawn through three of the drying tubes after being dehydrated in its desiccant tubes 128a, 128b, and 128c; first through the second stage atmospheric drying tube 180, then through the first stage atmospheric drying tube 170, and finally through the first stage primary drying tube 140. The purge gas is then drawn through the double-head purge vacuum pump 124 and exhausted from the system.

In an embodiment of the invention, an intake fan 136 and an outtake fan 137 may be provided on the shell of the ice bath 134, such as on the top horizontal surface of the shell. The fans 136, 137 operate in opposite directions in order to draw a flow of air through the ice bath 134. Cooled air exiting the outtake fan 137 can then be used to cool nearby electrical components via convection, such as the FTIR instruments 50a, 50b or the power source 80. Operation of the fans 136, 137 may be regulated by a control device (not shown) to provide cooling air as needed. Also, the ice bath 134 may operate as a moisture sink in areas of high humidity to essentially pre-treat ambient air before it is drawn into the purge air drying system.

Figure 6:
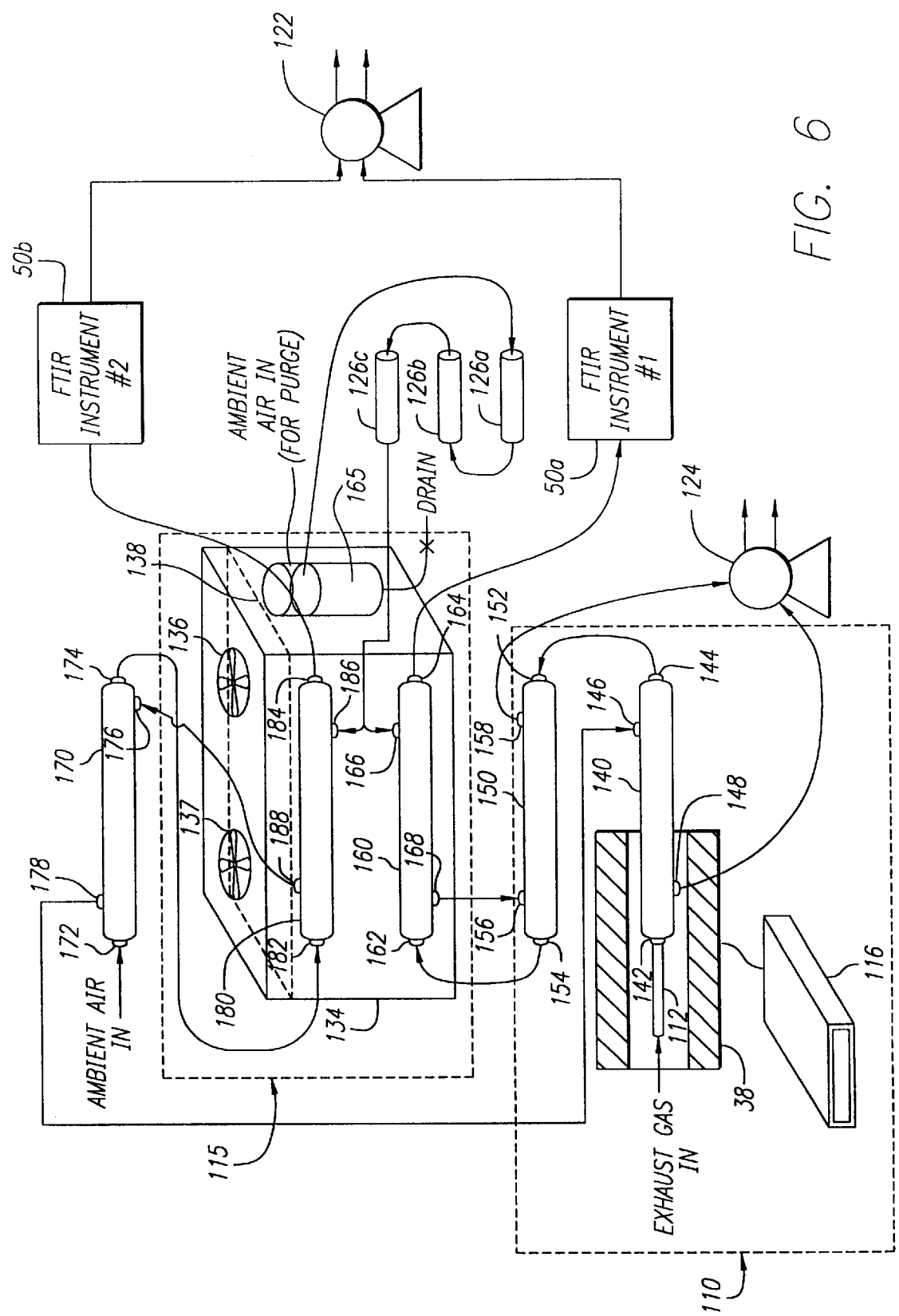
FIG. 6 is a schematic diagram of an alternative embodiment of the water removal system of FIG. 5.

Referring now to FIG. 6, an alternative embodiment of the present invention is provided wherein a water trap 165 is included in the water removal system. The water trap 165 comprises a volumetric container device having an inlet and an outlet. The water trap 165 is located in the ice bath 134 such that the water trap is partially submerged below the ice water level 138. The inlet of the water trap 165 is also submerged below the ice water level 138, and is adapted to receive ambient air used as a purge air source. The outlet of the water trap 165 is coupled to the input of the first desiccant tube 126a. The water trap 165 operates to remove moisture from the ambient air prior to entering the three desiccant tubes 126a–126c. This removal of moisture in turn increases the efficiency of the water removal system. More particularly, the ambient air cools by passing through the inlet tubing that is submerged below the ice water level 138, thereby causing moisture in the ambient air to condense and collect within the water trap 165. The water trap 165 may further include a drain pipe 163 extending from the bottom thereof having a check valve that permits the water trap 165 to be periodically purged of collected water. In this alternative embodiment, the third desiccant tube 126c provides a source of ambient purge air for both the primary and secondary gas stream, thereby eliminating the need for desiccant tubes 128a–128c of FIG. 5.

Figure 7:
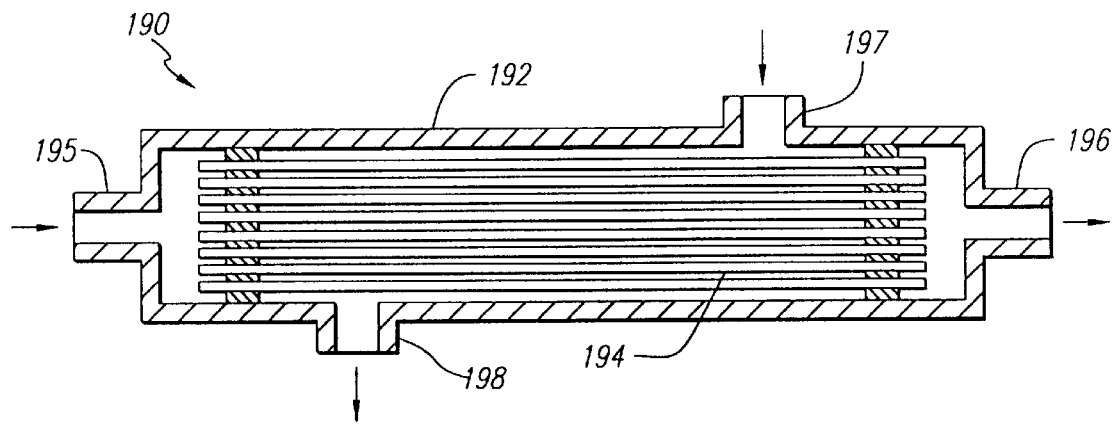
FIG. 7 is a side sectional view of an exemplary perflourinated polymer material drying tube.
Figure 8:
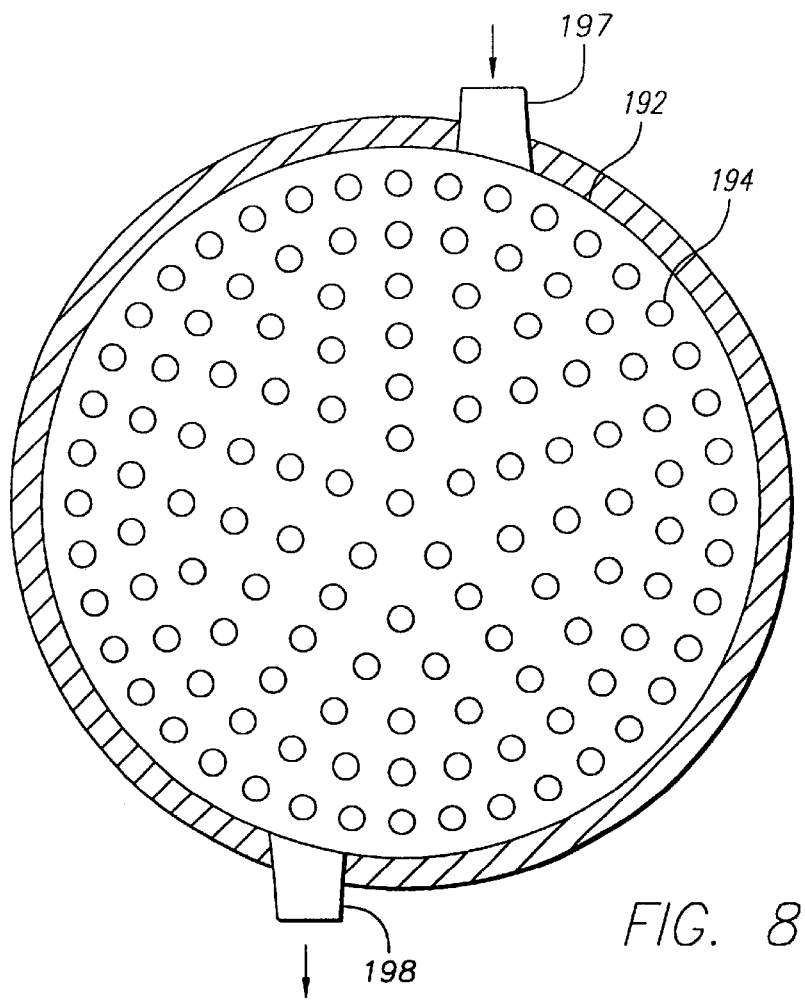
FIG. 8 is an end section view of the exemplary perflourinated polymer drying tube of FIG. 7.

FIGS. 7 and 8 show with greater particularity an exemplary drying tube 190, which provides the drying tubes 140, 150, 160, 170, 180 described above with respect to FIG. 5. In a preferred embodiment of the invention, the drying tube may be provided by a PD series gas dryer manufactured by Perma Pure, Inc., of Toms River, N.J. The exemplary drying tube 190 contains a perflourinated polymer material, but it should be appreciated that any substance comprising an ion exchange material exhibiting a selectively high permeability to transfer of water vapor compared to other gaseous compositions would serve the same purpose. More particularly, the perflourinated polymer material has a Teflon backbone, with periodic side chains of perflourinated ether terminating in a sulfonic acid group. These acid groups form "ionic channels" that extend through the walls of the perflourinated polymer tubing. Each sulfonic acid group can absorb up to thirteen molecules of water. Where the partial pressure of the water in the sample exceeds that external to the tubing, water molecules will travel along the ionic channels and be released outside the tubing. This process is selective for water, although some other species such as alcohols, ketones and ammonia may experience some loss.

The drying tube 190 comprises an elongated cylindrical shell 192 made of a rigid plastic or metal material. The shell 192 further includes a sample gas inlet 195 comprising a small protruding cylindrical tube extending from a first axial end thereof, and a sample gas outlet 196 comprising a small protruding cylindrical tube extending from the opposite end of the shell. A purge gas in let 197 is located on the outer surface of the shell 192 and comprises a small cylindrical tube extending outwardly in a radial direction. Similarly, a purge gas outlet 198 is located on the opposite outer surface of the shell 192 and comprises a small cylindrical tube extending outwardly in a radial direction.

The shell 192 contains therein a bundle of selectively permeable perflourinated polymer plastic tubes 194 that extend axially through the shell 192. The perflourinated polymer plastic tubes 194 are coupled at respective ends to form a manifold at either end. As shown in FIG. 8, spaces may be provided between each respective one of the perflourinated polymer plastic tubes 194 to permit the flow of moisture from the sample gas into the purge gas. Further, a space may be provided between the sides of the shell 192 and the outermost ones of the perflourinated polymer plastic tubes 194. The shell 192 and the perflourinated polymer tubes 194 allow for flow of two separate gas streams. The sample gas flows along the perflourinated polymer tubes 194 and water vapor passes through the sides of the perflourinated polymer tubes. The purge gas flows past the perflourinated polymer tubes 194 in the bundle and thereby carries water vapor from the sample gas into the purge gas stream.

More particularly, FIG. 7 shows the flow path of the sample and purge gases in the exemplary drying tube 190. The sample gas enters through the inlet 195, and flows through the bundle of perflourinated polymer plastic tubes 194 in an axial direction, and then exits via the outlet 196. While the sample gas is flowing through the perflourinated polymer plastic tubes 194, a purging gas enters through the dry purge inlet 197 and flows through the shell 192 in a counterflow direction to the sample gas travelling in the tube bundle. The purge gas then exits via the wet purge outlet 198. Because of the moisture permeability properties of the perflourinated polymer tubes 194, water vapor contained within the sample gases passes through the walls of the perflourinated polymer tubes via osmosis and into the dried air stream flowing through the shell 192. As known in the art, the perflourinated polymer material is selectively permeable. As a result, the other components of the sample gas are retained in the perflourinated polymer tubes.

It is important that the purge gas have a moisture content that is less than that of the sample gas. While a parallel type flow pattern could be used, a counter-flow exchange has been chosen because it is considered more efficient. Even utilizing a counter-flow osmosis exchange, however, the level of moisture removal achieved by merely passing the air samples through the perflourinated polymer tubes 194 alone is considered insufficient to lower the moisture content low enough to achieve a sufficiently accurate gas analysis. Therefore, the present invention includes the heating stage 110 and the cooling stage 115 to change the temperature of the gas samples at their respective stages to enhance the drying properties of the system. This is done by manipulating the proximity of the gases to their dew points. First, the heating stage 110 maintains the moisture in the sample gas in a vapor state. Then, the cooling stage 115 lowers the temperature of the sample gas just prior to it entering either of the FTIR instruments 50a, 50b. The sequentially staged drying tubes included in the respective heating and cooling stages 110, 115 ensure that the sample gases reaching the FTIR instruments 50a, 50b are as close to completely dry as possible.

Figure 9:
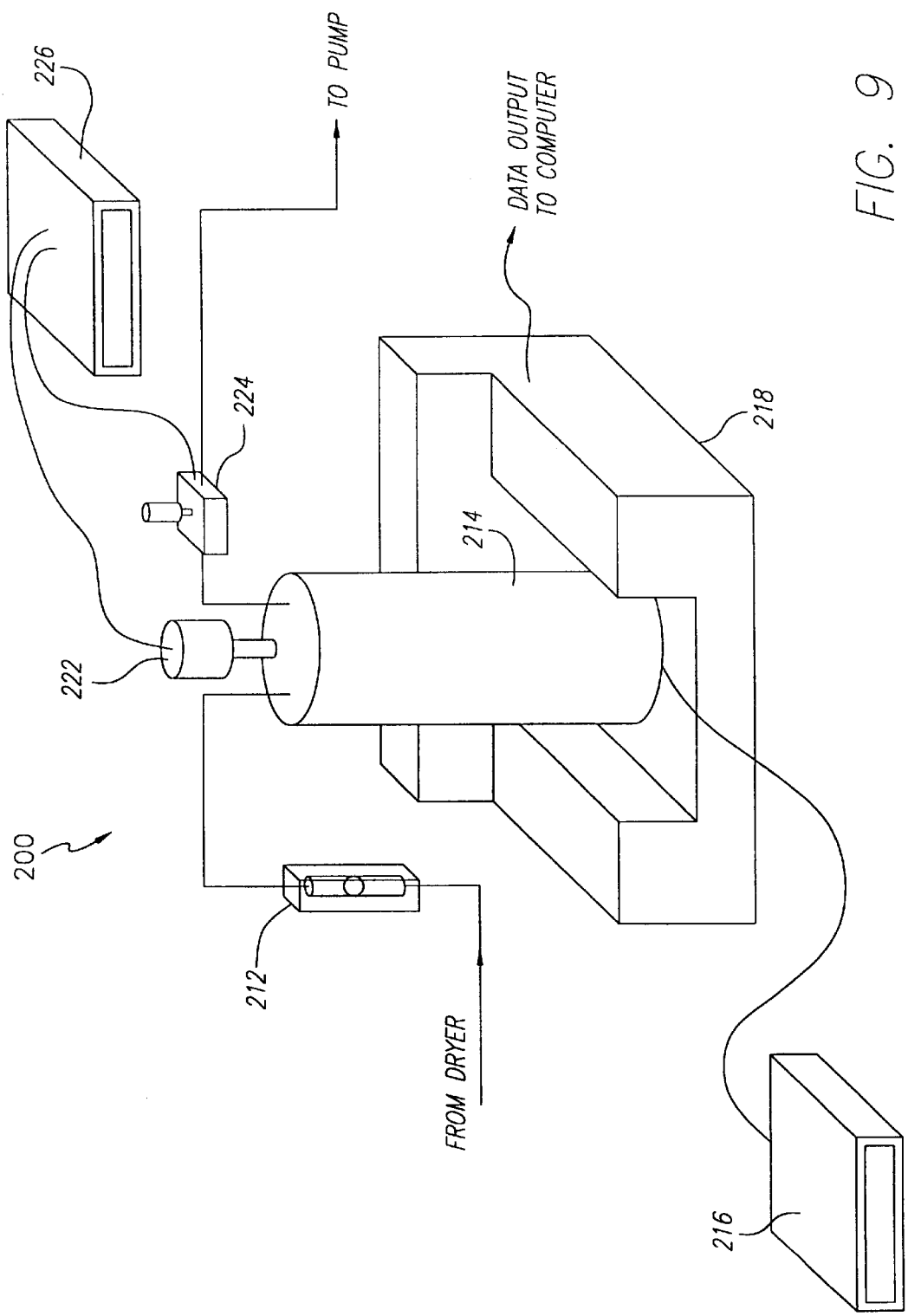
FIG. 9 is a system schematic drawing of a Fourier transform infrared instrument.

FIG. 9 shows with greater particularity an exemplary FTIR system 200, which provides the FTIR instruments 50a, 50b described above with respect to FIG. 1. The FTIR system 200 comprises a flowmeter 212, a gas cell 214, a heater controller 216, and an FTIR analyzer 218. The flowmeter 212 comprises an instrument adapted to measure an in-line gaseous flow in volumetric units per unit of time.

The gas cell 214 comprises a resonant cavity for containing a gas sample. The gas cell 214 may comprise a ten meter path-length gas cell. The flowmeter 212 is connected to the gas cell 214. The heater controller 216 controls the temperature of the gas cell 214 and is connected to the gas cell 214. The Fourier transform infrared (FTIR) gas analyzer 218 provides an output signal that is indicative of the concentration of a component of interest of a sample gas, the analyzer being of the type having an infrared source for generating infrared radiation. In a preferred embodiment of the invention, the FTIR gas analyzer may be provided by a Nicolet Model 460 FTIR. The FTIR analyzer 218 is also connected to the gas cell 214.

The FTIR system further comprises a pressure transducer 222, a pressure control valve 224, and a pressure controller 226. The pressure transducer 222 senses gas pressure in the gas cell 214. The pressure transducer 222 is located on top of the gas cell 214 and is connected to the gas cell 214. The pressure control valve 224 comprises an automatically controlled valve adapted to regulate a pressure in an in-line system where a corresponding pressure control signal is received. The pressure control valve 224 is connected to the gas cell 214. The pressure controller 226 regulates pressure of the gas cell 214 in response to a control signal provided by the pressure transducer 222. The pressure controller 226 may be set to varying pressure control values. The pressure controller 226 is connected to the pressure transducer 222 and the pressure control valve 224.

In the exemplary FTIR system 200, a gas, either the exhaust gas or ambient air that has been dried in the drying system 40, enters the flowmeter 212 wherein the volumetric flowrate of the gas is measured. The gas flows from the flowmeter 212 to the gas cell 214. The gas is contained in the cavity of the gas cell 214, and is irradiated therein by an infrared source (not shown) contained within the FTIR analyzer 218. The FTIR analyzer 218 produces an output signal that is indicative of the concentration of the constituent components of the gas located in the gas cell 214. The output signal is sent to a computer 60 (see FIG. 1). The heater controller 216 maintains the temperature of the gas cell 214 at a constant level to ensure precise analysis of the sample gas, such as 70° C. The output signal is sent to the computer 60.

The pressure of the gas in the gas cell 214 is controlled by the pressure controller 226. The pressure controller 226 receives a signal from the pressure transducer 222 relating to the pressure in the gas cell 214. The pressure controller 226 then compares the signal sent by the pressure transducer 222 with its programmed system pressure. If the pressure is greater than ideal system pressure, the pressure controller 226 transmits a signal to the pressure control valve 224 to open and relieve system pressure. This sensing, comparison with a predetermined pressure, and transmission of signals to the pressure control valve 224, is a continuous process and thereby regulates the pressure in the gas cell 214 at the predetermined pressure.

FIG. 10 depicts an example of the information contained on the display/control panel 70. The display/control panel 70 displays the level of pollutants found in emissions and intake air in parts per million (ppm) overlaid on a single axis, where the vertical axis 276 shows the ppm and is compared to a time averaged display as the vehicle travels, the time averaged data being displayed across the x-axis 278. This time averaged data displays in real-time as the vehicle 15 is travelling. Using the comparative features of the logic, both the level of pollutants in the exhaust and the ambient air may be displayed simultaneously as shown where the exhaust graphical line 272 represents the level of pollutants in the emission and the ambient graphical line 274 represents the level of pollutants in the atmosphere. The display can be switched between four user-selected target pollutants (NMHC, NMHC+NO, NO, CO) and one combination display. The combination display shows three pollutants on the screen simultaneously. Switching occurs between the various screens activated by touch or movement of a mouse or other pointing device (not shown).

The display/control panel 70 further comprises a touch-screen display 282, a negative emission percentage record 284, a negative emissions visual record 286, and a lighted indicator 288 to show when negative emissions are occurring. The touch screen display 282 is an interactive display module wherein commands may be relayed to the central processing unit of the computer 60 by touching specific portions of the panel. In the embodiment shown, either one or more of a variety of pollutant types could be displayed, NMHC, NMHC+NO, NO, CO, or a combination of the elements. NMHC refers to an non-methane hydrocarbon; NO refers to a nitrous oxide; and CO refers to carbon monoxide. It should be apparent to one skilled in the art that other types of pollutants or combinations thereof could also be added to the touch screen display 282. The touch screen display 282 may be located across the bottom of the display/control screen 70.

An indication showing when the vehicle has reached a negative emissions stage "negative emissions" is shown in three ways: (1) an enunciator light, (2) a horizontal bar graph, and (3) cumulative percentage. The term negative emissions relates to pollutant concentrations that are less than those of the air surrounding the vehicle. The negative emission percentage record 284 is a data field wherein the cumulative percentage of the trip as a function of the amount of time when the vehicle had "negative emissions" is shown. The negative emissions percentage record 284 may be displayed in the upper left-hand corner of the display/control panel 70 screen. The negative emissions visual record 286 is a horizontal bar graph wherein an indication is shown of the times when the vehicle achieved negative emissions. The negative emissions visual record 286 may comprise a bar graph of different colors to indicate when the vehicle attained negative emissions as a function of time during the trip period. For example, the color green may be used to indicate when negative emissions have been achieved. The negative emissions indicator light 288 is an enunciator light that lights up when the vehicle 15 is achieving negative emissions. The negative emissions indicator light 288 may be located at the top of the display/control panel 70.

As the vehicle 15 travels, the pollutant levels in both the exhaust gas and the ambient air are displayed simultaneously by the exhaust graphical line 272 and the ambient graphical line 274 respectively, in ppm. The graphical lines scroll to the left as a function of time, such that the most recent real-time data is shown on the right-most portion of the display/control panel 70. The operator selects the type or combination of pollutant data to be displayed by touching the appropriate sections of the touch screen display 282. When the level of pollutants in the vehicle exhaust are less than the level of pollutants in the atmosphere, the negative emissions indicator 288 lights, the negative emissions visual record 286 displays a corresponding color indication as a function of trip time, and the negative emission percentage record 284 display the percentage of the trip time for which negative emissions have been achieved.

FIGS. 11A, B, C show a flow chart of the real-time display/control software logic 300. The software logic 300 for the display/control panel 70 provides a real-time, simultaneous display of ambient and tailpipe pollutant concentrations overlaid on a single axis, and can be distinguished into two major stages, a configuration stage 310, a comparative stage 340, and a display stage 350. In the configuration stage 310, the user specifies the types of data and parameters for eventual display. In the comparative stage 340, the data accumulated relating to the pollutant levels in the exhaust gas is compared to the pollutant level of the ambient air. In the display stage 350, the data is displayed, and the user is able to manipulate the presentation of the data that has been selected.

The configuration stage 310 of the software logic 300 is begun by a start step 312. Once the routine has begun, through the configuration screen, the user chooses from a variety of specifications in the specification step 314. In the specification step 314, the user can specify the input files for the ambient and tailpipe displays; the target pollutants; the x and y scales (concentration and time); the number of data points used to compute a running average to allow a certain degree of smoothing; and the pollutants to be summed prior to display, for example $NO+NO_2=NO_x$. Additionally, the user can specify the compound used to recognize data acquisition errors. When such errors or "bad" data points are encountered, the software will display the previous "good" data point, thereby avoiding gaps in the display. The software accomplishes this error correction by examining the relative error field of the acquired data. If this error exceeds a user-specified threshold, an acquisition error is assumed.

Two types of display modes are available for the user to choose between, a strip chart mode at step 316 and an oscilloscope mode at step 318. The strip chart mode features a scrolling display, and the oscilloscope mode refreshes the screen only after a predetermined time interval. Depending on which mode the user chooses, the software logic configures the screen for a scrolling display at step 320 or a non-scrolling display at step 322 respectively. Additionally, the user is able to choose either a real-time display mode at step 324 or a playback mode at step 326. If the user selects the real-time mode, data is retrieved in real time at step 328 from the FTIR devices 50a and 50b shown in FIG. 1. If the playback mode is selected, data is retrieved from the archived files at step 332. In addition to selecting a playback mode, the user is able to select the playback speed in that same step.

Once the configuration stage 310 has been completed, the display stage 350 is begun by the user starting the display routine with step 352. Once the display routine has started, and either the real-time mode or the playback mode has been chosen above, the data begins to be displayed on the screen of the level of the pollutant X concentration as a function of time at step 354. At this point, the user may change the chart display and/or the components being monitored at step 356. The user may choose either a single chart display mode at step 358 by selecting one of the pollutants, or choose the combination chart display at step 360 by selecting a combination of the pollutants. This selection is made by pressing one of the choices on the touch screen display 282 shown in FIG. 10. If a single pollutant has been selected, the display charts the concentration of pollutant X versus time at step 362. If the combination chart is selected, the display charts the monitored pollutants on separate pre-selected charts as a function of time at step 364. The display loop continues to repeat itself as new emission and ambient data points are retrieved at step 366 until changed by the user at step 356, in which case the above sequence is begun again.

The program next performs a comparative function in the comparative stage 340, begun by comparing the ambient data points to the exhaust data points at step 368. If the exhaust pollutant concentration is less than that of the ambient pollutant concentration at step 372, the negative emission indicator 288 is lighted, the negative emissions visual record 286 bar lights green or another suitable color to show clean emissions, and the negative emission percentage record value 284 is recalculated and displayed as shown on FIG. 10. If the exhaust pollutant concentration is greater than that of the ambient pollutant concentration at step 370, the negative emission indicator 288 is turned off, the bar graph of the negative emissions visual record is displayed as a color other than green, and the negative emission percentage record is recalculated and displayed.

The comparative stage 340 is continuously performed until either the user selects a button to stop the display at step 374, or the end of the data being retrieved from an archived file is reached at step 376. If either the user stops the display or the end of data being retrieved is reached, the display is terminated at step 378.

While a mobile system has been shown, the present emissions measuring system could also be used in an emission laboratory as a stationary instrument. As known in the art, an emissions laboratory may be mobile and/or portable wherein the laboratory including a simple dynamometer can be transported to different locations by truck. The present emissions measuring system would have distinct advantages over such emissions laboratories in terms of size. It should be appreciated that the present emissions measuring system could be included with a device to measure exhaust flow in order to convert measured emissions from a concentration basis to a mass basis.

Having thus described a preferred and alternative embodiment of the emissions measuring system, it should be apparent to those skilled in the art that certain advantages of the aforementioned system have been achieved. It should also be appreciated that various modifications, adaptations, and alternative embodiments thereof may be made within the scope and spirit of the present invention. For example, a gas analysis system using FTIR devices has been illustrated, but it should be apparent that the inventive concepts described above would be equally applicable to other compact gas analysis system utilizing other types of systems for gas analysis. The invention is further defined by the following claims.

What is claimed is:

1. An emissions measurement system for a vehicle having an emissions source, comprising:

a first intake coupled to said emission source to collect vehicle emission gases therefrom;

a second intake coupled to a portion of said vehicle spaced from said emission source to collect ambient air;

a first analyzer disposed in said vehicle and coupled to said first intake, said first analyzer providing a first electrical signal corresponding to chemical content of said vehicle emission gases;

a second analyzer disposed in said vehicle and coupled to said second intake, said second analyzer providing a second electrical signal corresponding to chemical content of said ambient air; and a processor coupled to said first and second analyzers, said processor being adapted to process said first and second electrical signals and provide data corresponding to a comparison of said vehicle emission gases to said ambient air.

2. The emissions measurement system defined in claim 1, further comprising a dryer for removing moisture from the gas streams.

3. The emissions measurement system defined in claim 2, wherein said dryer further comprises;

a plurality of drying tubes coupled together in series, each one of said plurality of drying tubes further having a first flow path for sample gas and a second flow path for purge gas, said sample gas stream passing through said first flow path of each one of said plurality of drying tubes in series;

a cooling chamber having an interior volume maintained at a reduced temperature relative to an ambient temperature of said sample gas stream, at least one of said plurality of drying tubes being disposed in said cooling chamber; and a purge air source providing a supply of dried air, said purge air source being coupled to said plurality of drying tubes such that dried air passes through said second flow path of each one of said plurality of drying tubes in series;

wherein, said cooling chamber reduces temperature of said sample gas stream below its dew point to increase drying efficiency of said plurality of drying tubes.

4. The emissions measurement system defined in claim 3, wherein each of said plurality of drying tubes comprises an ion exchange polymer material exhibiting a selectively high permeability to transfer of water compared to other gaseous compositions.

5. The emissions measurement system defined in claim 3, wherein said plurality of drying tubes each comprise an outer shell having a sample gas inlet and a sample gas outlet, a plurality of internal tubes comprised of said ion exchange polymer material are disposed within said outer shell extending between said sample gas inlet and said sample gas outlet.

6. The emissions measurement system defined in claim 3, wherein said plurality of drying tubes each comprise a purge gas inlet and a purge gas outlet, whereby water contained in said sample gas flow passes through sides of said internal tubes and is removed through said purge gas outlet.

7. The emissions measurement system defined in claim 3, wherein the cooling chamber further comprises an ice bath.

8. The emissions measurement system defined in claim 3, further comprising a heater coupled to at least one of said plurality of drying tubes prior to said cooling chamber, said heater being adapted to increase temperature of said sample gas stream above said ambient temperature to maintain water contained in said sample gas stream in a vapor state.

9. The emissions measurement system defined in claim 3, wherein said purge air source further comprises at least one tube containing a desiccant material.

10. The emissions measurement system defined in claim 3, further comprising a vacuum pump coupled to said plurality of drying tubes and adapted to draw said sample gas flow therethrough.

11. The emissions measurement system defined in claim 3, further comprising a fan coupled to the cooling chamber to provide a source of cooled air.

12. The emissions measurement system defined in claim 3, wherein said plurality of drying tubes further comprises three drying tubes.

13. The emissions measurement system defined in claim 3, further comprising a plurality of secondary drying tubes coupled together in series, each one of said plurality of secondary drying tubes further having a first flow path for a secondary sample gas stream and a second flow path for a secondary purge gas, said secondary sample gas stream passing through said first flow path of each one of said plurality of secondary drying tubes in series.

14. The emissions measurement system defined in claim 13, wherein at least one of said plurality of secondary drying tubes are disposed in said cooling chamber.

15. The emissions measurement system defined in claim 1, further comprising a device for removing water from said sample gas stream, said apparatus comprising:

first means for drying said sample gas stream at a temperature above an ambient temperature; and second means for drying said sample gas stream at a temperature below said ambient temperature.

16. The emissions measurement system defined in claim 15, wherein said first drying means further comprises at least one drying tube having a first flow path for sample gas and a second flow path for purge gas, and a heater coupled to said at least one drying tube, said heater being adapted to increase temperature of said sample gas stream above said ambient temperature to maintain water contained in said sample gas stream in a vapor state.

17. The emissions measurement system defined in claim 15, wherein said second drying means further comprises a cooling chamber having an interior volume maintained at a reduced temperature relative to said ambient temperature of said sample gas stream, at least one drying tube being disposed in said cooling chamber, said cooling chamber reducing temperature of said sample gas stream below its corresponding dew point to thereby increase drying efficiency of said at least one drying tube contained therein.

18. The emissions measurement system defined in claim 17, wherein said at least one drying tube of each of said first and second drying means each comprises an ion exchange polymer material exhibiting a selectively high permeability to transfer of water compared to other gaseous compositions.

19. The emissions measurement system defined in claim 17 wherein said at least one drying tube of each of said first and second drying means each comprises an outer shell having a sample gas inlet and a sample gas outlet, a plurality of internal tubes comprised of said ion exchange polymer material are disposed within said outer shell extending between said sample gas inlet and said sample gas outlet.

20. The emissions measurement system defined in claim 19, wherein said at least one drying tube of each of said first and second drying means each comprises a purge gas inlet and a purge gas outlet, whereby water contained in said sample gas flow passes through sides of said internal tubes and is removed through said purge gas outlet.

21. The emissions measurement system defined in claim 17, wherein the cooling chamber further comprises an ice bath.

22. The emissions measurement system defined in claim 15, further comprising a purge air source providing a supply of dried air to said first and second drying means.

23. The emissions measurement system defined in claim 22, wherein said purge air source further comprises at least one tube containing a desiccant material.

24. The emissions measurement system defined in claim 15, wherein said second drying means further comprising means for drying a secondary sample gas stream.

25. The emissions measurement system defined in claim 1, wherein said first analyzer and said second analyzer comprise a first and a second Fourier transformer infrared gas analysis spectrometer, respectively.

26. The emissions measurement system defined in claim 25, wherein each of said first and said second Fourier transformer infrared gas analysis spectrometers further comprise:
   an infrared radiation source;
   a resonant cavity adapted to contain a gas sample, said infrared radiation source being conducted into said resonant cavity.

27. The emissions measurement system defined in claim 1, further comprising a display device wherein the data corresponding to said vehicle emissions and said ambient air may be displayed, said display device connected to said processor.

28. The emissions measurement system defined in claim 27 wherein said display device further comprises an interactive screen wherein said interactive screen produces electrical signals when touched and sends said electrical signals to said processor.

29. The emissions measurement system defined in claim 1, where a vacuum pump is utilized to draw the exhaust gas through the pollution measuring apparatus.

30. A method of measuring constituent components in vehicle exhaust gases, comprising the steps of:
   collecting a sample of vehicle exhaust gases from an emission system of a vehicle;
   collecting a sample of ambient air;
   analyzing said vehicle exhaust gas sample and determining said constituent components of said vehicle exhaust gas sample
   analyzing said ambient air sample and determining constituent components of said ambient air sample; and
   comparing said determined chemical content of said vehicle emission gases and said ambient air.

31. The method of claim 30, further comprising the step of removing moisture from said vehicle exhaust gas and said ambient air sample.

32. The method of claim 31, wherein said step of removing moisture further comprises a method of cooling said gases to an approximate dew point.

33. The method of claim 30, wherein each of said analyzing steps further comprises conducting Fourier transformer infrared gas analysis.

34. The method of claim 30, further comprising the step of displaying said constituent components of said vehicle exhaust gas and said constituent components of said ambient air.

35. The method of claim 30, further comprising the step of specifying at least one of said constituent components of said vehicle exhaust gas sample and said ambient air sample to be displayed, scale and range of axes of said display, a degree of data smoothing, and an error detection threshold.

36. The method of claim 30, further comprising the step of selecting one of a strip-chart and an oscilloscope mode.

37. The method of claim 30, further comprising the step of specifying one of a real-time and a playback mode.

38. The method of claim 30, further comprising the step of retrieving data corresponding to said constituent components of said vehicle emissions gases and said ambient air.

39. The method of claim 30, further comprising the step of displaying a chart of said constituent components versus time.

40. The method of claim 30, further comprising the step of comparing a level of said constituent components of said vehicle emissions gases to a level of said constituent components of said ambient air.

41. The method of claim 30, further comprising the step of lighting display indicators showing when said constituent components of said vehicle emissions gases reach a level that is less than a corresponding level of constituent components of said ambient air.

42. The method of claim 30, further comprising the step of calculating a percentage of time that said constituent component levels of said ambient air are greater than said constituent component levels of said vehicle emission gases.

* * * * *